(12) United States Patent
Ross et al.

(10) Patent No.: US 7,676,433 B1
(45) Date of Patent: Mar. 9, 2010

(54) SECURE, CONFIDENTIAL AUTHENTICATION WITH PRIVATE DATA

(75) Inventors: David Justin Ross, Redmond, WA (US); Bill G. Cornell, Bellevue, WA (US)

(73) Assignee: RAF Technology, Inc., Redmond, WA (US)

( * ) Notice: Subject to any disclaimer, the term of this patent is extended or adjusted under 35 U.S.C. 154(b) by 1023 days.

(21) Appl. No.: 11/277,133

(22) Filed: Mar. 21, 2006

Related U.S. Application Data

(60) Provisional application No. 60/665,273, filed on Mar. 24, 2005.

(51) Int. Cl.
    G06Q 30/00 (2006.01)
(52) U.S. Cl. .............................. 705/39; 705/26; 705/27; 705/37; 705/38; 705/40; 705/41
(58) Field of Classification Search ................. 713/155, 713/161; 705/44, 39
    See application file for complete search history.

(56) References Cited

U.S. PATENT DOCUMENTS

| | | | |
|---|---|---|---|
| 4,890,323 A | 12/1989 | Beker et al. |
| 5,259,025 A | 11/1993 | Monroe et al. |
| 5,265,159 A | 11/1993 | Kung |
| 5,375,244 A | 12/1994 | McNair |
| 5,436,970 A | 7/1995 | Ray et al. |
| 5,613,004 A | 3/1997 | Cooperman et al. |
| 5,687,236 A | 11/1997 | Moskowitz et al. |
| 5,742,685 A | 4/1998 | Berson et al. |
| 5,774,551 A | 6/1998 | Wu et al. |
| 5,832,497 A | 11/1998 | Taylor |
| 5,838,814 A | 11/1998 | Moore |
| 5,841,886 A | 11/1998 | Rhoads |
| 5,841,888 A | 11/1998 | Setlak |
| 5,844,817 A | 12/1998 | Lobley et al. |
| 5,850,442 A | 12/1998 | Muftic |
| 5,870,499 A | 2/1999 | Bender et al. |
| 5,870,723 A | 2/1999 | Pare, Jr. et al. |
| 5,872,848 A | 2/1999 | Romney et al. |
| 5,883,810 A | 3/1999 | Franklin et al. |

(Continued)

FOREIGN PATENT DOCUMENTS

WO     WO9922330     5/1999

(Continued)

OTHER PUBLICATIONS

PCT/US03/17072 International Search Report dated Aug. 20, 2003.

(Continued)

Primary Examiner—Creighton Smith
(74) Attorney, Agent, or Firm—Stolowitz Ford Cowger LLP

(57) ABSTRACT

Risk of personal identity theft, especially in connection with on-line commerce, is mitigated by maintaining private data in a secure database maintained by a trusted third party verification service. To authenticate the identity of a user or customer, in one embodiment, a knowledge-based challenge is issued to the user, and the response is compared to stored data by the verification service. The verification service reports to the vendor, to authenticate the user identity, capability and or authorization for the proposed transaction without disclosing private data to the vendor.

21 Claims, 1 Drawing Sheet

U.S. PATENT DOCUMENTS

| | | | |
|---|---|---|---|
| 5,884,270 | A | 3/1999 | Walker et al. |
| 5,893,090 | A | 4/1999 | Friedman et al. |
| 5,910,988 | A | 6/1999 | Ballard |
| 5,940,507 | A | 8/1999 | Cane et al. |
| 5,973,731 | A | 10/1999 | Schwab |
| 5,987,440 | A | 11/1999 | O'Neil et al. |
| 5,991,408 | A | 11/1999 | Pearson et al. |
| 6,014,650 | A | 1/2000 | Zampese |
| 6,026,166 | A | 2/2000 | LeBourgeois |
| 6,026,491 | A | 2/2000 | Hiles |
| 6,039,248 | A | 3/2000 | Park et al. |
| 6,073,242 | A | 6/2000 | Hardy et al. |
| 6,085,322 | A | 7/2000 | Romney et al. |
| 6,111,954 | A | 8/2000 | Rhoads |
| 6,118,872 | A | 9/2000 | Kashima et al. |
| 6,122,403 | A | 9/2000 | Rhoads |
| 6,125,349 | A | 9/2000 | Maher |
| 6,175,923 | B1 | 1/2001 | Bailey |
| 6,202,151 | B1 | 3/2001 | Musgrave et al. |
| 6,230,148 | B1 | 5/2001 | Pare, Jr. et al. |
| 6,263,447 | B1 | 7/2001 | French et al. |
| 6,282,658 | B2 | 8/2001 | French et al. |
| 6,363,376 | B1 | 3/2002 | Wiens et al. |
| 6,363,485 | B1 | 3/2002 | Adams et al. |
| 6,385,620 | B1 | 5/2002 | Kurzius et al. |
| 6,496,936 | B1 | 12/2002 | French et al. |
| 6,532,459 | B1 | 3/2003 | Berson |
| 6,618,806 | B1 | 9/2003 | Brown et al. |
| 6,643,648 | B1 | 11/2003 | Ross et al. |
| 6,714,944 | B1 | 3/2004 | Shapiro et al. |
| 6,836,845 | B1 | 12/2004 | Lennie et al. |
| 6,845,453 | B2 | 1/2005 | Scheidt et al. |
| 6,904,407 | B2 | 6/2005 | Ritzel |
| 6,959,394 | B1 | 10/2005 | Brickell et al. |
| 7,039,951 | B1 | 5/2006 | Chaudhari et al. |
| 7,086,085 | B1 | 8/2006 | Brown et al. |
| 7,131,009 | B2 | 10/2006 | Scheidt et al. |
| 7,318,048 | B1 * | 1/2008 | King .......................... 705/39 |
| 7,343,623 | B2 | 3/2008 | Ross |
| 2002/0091945 | A1 | 7/2002 | Ross |
| 2003/0037248 | A1 | 2/2003 | Launchbury et al. |
| 2003/0105762 | A1 | 6/2003 | McCaffrey et al. |
| 2004/0039917 | A1 | 2/2004 | Ross |
| 2004/0064454 | A1 | 4/2004 | Ross et al. |
| 2004/0139098 | A1 | 7/2004 | Margolus et al. |
| 2005/0187873 | A1 * | 8/2005 | Labrou et al. ................. 705/40 |
| 2005/0238207 | A1 | 10/2005 | Tavares |
| 2008/0127305 | A1 | 5/2008 | Ross |

FOREIGN PATENT DOCUMENTS

| | | |
|---|---|---|
| WO | WO03103215 | 12/2003 |

OTHER PUBLICATIONS

PCT/US01/46135 International Search Report dated Jul. 9, 2002.

Allison Linn, "Microsoft Unveils.NET Strategy," The Seattle Times, Mar. 19, 2001, published on the internet at <http://dailynews.yahoo.com/h/xseap/20010319/microsoft hailstorm 1.html>.

PressPass, "Microsoft's Bill Gates Previews New 'Hailstorm' Technologies to Usher in New Era of More Consistent Personalized and User-Centric Experiences," Mar. 19, 2001, published on the internet at <http://www.microsoft.com/ PressPass/press/2001/Mar01/03-19HailstormPR.asp.>.

PressPass, "Microsoft's Bill Gates Previews New 'Hailstorm' Technologies to Usher in New Era of More Consistent Personalized and User-Centric Experiences," Mar. 19, 2001, published on the internet at <http://www.microsoft.com/ PressPass/press/2001/Mar01/0.

* cited by examiner

_US 7,676,433 B1_

SECURE, CONFIDENTIAL AUTHENTICATION WITH PRIVATE DATA

RELATED APPLICATIONS

This application claims priority from U.S. Provisional Application No. 60/665,273 filed Mar. 24, 2005 and incorporated herein by this reference.

COPYRIGHT NOTICE

© 2005-2006 RAF Technology Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This disclosure pertains to methods and systems for leveraging private data to authenticate the identity of a user to a target service without disclosing the private data.

BACKGROUND OF THE INVENTION

Online verification of an individual comprises two parts: establishing the existence of an identity that is allowed to perform the transaction, and establishing that the present user has that identity. A common method for establishing the existence and content of the online identity claimed by the user is to ask the user for personal information items that are presumed to be known by him and by the system but by no one else. These items fall into two broad (and somewhat overlapping) categories: what we call herein "in-wallet" and "out-of-wallet" data.

In-wallet data is data you know about yourself or can find quickly and easily, for example by consulting cards carried "in your wallet". Name, address, telephone number, Social Security number (SSN), driver's license number (DLN), and birth date are examples of in-wallet data. Mortgage holder, last transaction amount to a merchant or government agency, and car registration number are examples of out-of-wallet data. Often in- and out-of-wallet data are used sequentially to authenticate a person. In-wallet data is used to determine which identity is claimed, and then out-of-wallet data (presumably harder for a fraudster to obtain) is used to establish that the user is that person.

The difficulty with this approach is that for it to work, the "private" data of the user (e.g. out-of-wallet data) must be revealed to the authenticator so the authenticator can compare it with its file of authenticating information. This has two problems. First, the user must give the authenticator his private data and second, the authenticator had to get that data from some other source who gathered the data in the first place. Thus, as currently constructed, such a system only works if the authenticator already has a compendium of "private" data against which to compare the user's information.

Almost always that data comes from a third party who gathered the data. There are therefore at least three parties who have the "private" data—the user, the authenticator, and the third party provider. Worse yet, much of the so-called "private" data was gathered by the third party from "public" sources—phone books, credit reports, and the like. If the third party isn't the entity that gathers the data directly from the user, then they are in the same situation as the authenticator—they have to get the data from yet another party. There is no telling how many hands the "private" data passes through prior to its being used for authentication.

This presents a contradiction: to be useful for authentication, the user's data must be "private" (otherwise spoofers can get at it), but it also must be available to the authenticator—which reduces its privacy. Given the large number of authenticators currently working, and the small number of available data items on a person, it becomes clear that the more a data item is used for authentication, the less reliable it is for authentication. The increasing reluctance of users to supply social security number or mother's maiden name (two of the most common data elements previously used for authentication) indicates that users have a (correct) feeling that each use of such information makes it less private, and hence increasingly exposes the user to identity theft. Users, therefore, are increasingly reluctant to put private information in the hands of authenticators, no matter how trustworthy they believe the authenticators to be.

We have observed, however, that there are certain entities that users routinely trust with their private information: those whose business it is to use the information for its original purpose. For example, no one thinks twice about his bank possessing his bank account numbers or knowing the balance in his checking account. Banks are supposed to have that information, and require it to perform the functions users expect of them. Utilities are assumed to hold user utility bill information, such as gas and electric bills. Wireless telecommunications carriers hold a mountain of cell phone user call data.

BRIEF SUMMARY

We propose to leverage the reliability of private data held by trusted entities to provide secure, reliable authentication of a user without exposing that private data to others, or even to the authenticator. Additional aspects and advantages will be apparent from the following detailed description of preferred embodiments, which proceeds with reference to the accompanying drawings.

DETAILED DESCRIPTION OF PREFERRED EMBODIMENTS

Figure 1:
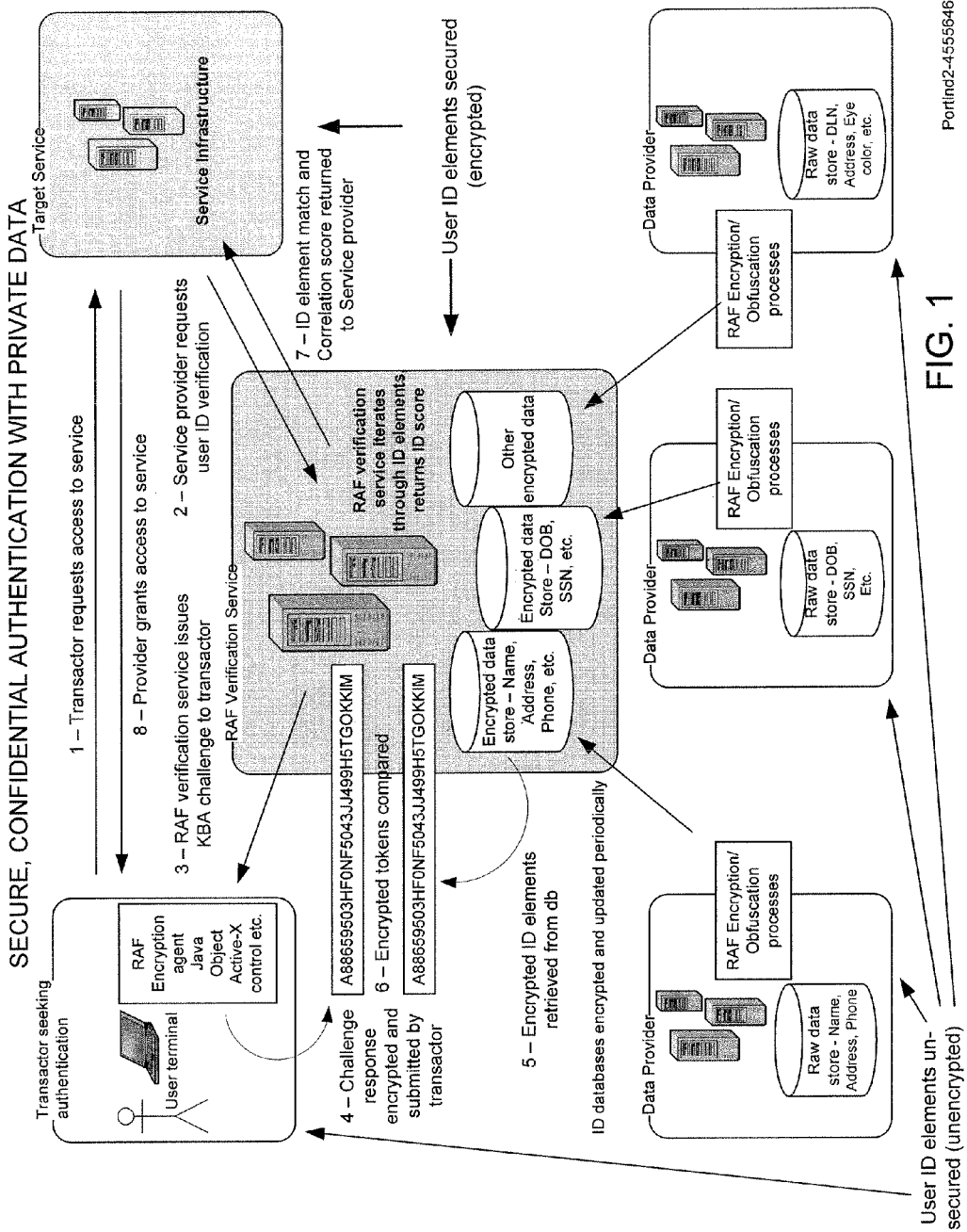
FIG. 1 is a simplified diagram illustrating one embodiment of a system and methods for authenticating the identity of a user to a target service without disclosing private data.

Embodiments described below may be useful both for initially establishing the identity of a user and for extending that initial identification to subsequent transactions. (The concept of extending identification to subsequent transactions alludes to the following. If a user provides identifying information (say social security number, driver's license number, name and address) to someone in order to get a user name and password, subsequent use of that user name and password extends the original identifying information to the transaction for which the user name and password are used. Indeed, such things as digital certificates and passwords are only as secure as the original identifying information used to obtain them).

Heretofore, it has been presumed that for an authenticator to use private data for authentication, he had to possess that information. One advantage of several embodiments described herein is to make that possession unnecessary. The present patent application proposes systems and methods of using private information without revealing that private information to anyone beyond those who already had that information because it is material to an existing business relationship with the user. The authenticator at no time has direct access to the user's private information, i.e., he cannot read it, and hence that information isn't "cheapened" through use.

The proposed methods and systems generally function as follows: A user wishes to be authenticated for some electronic transaction. The authenticator wants to establish (1) that there exists an identity capable of performing the transaction (that is, both able to and, if appropriate, authorized to perform it) and (2) that the user is that person. There exists a third party who, as part of his normal business relationship with the user, gathers private information on the user. An example would be a utility company who knows the amount of a user's most recent electric bill because they sent it to him. I use the utility bill as an example, but this invention does not depend on the precise nature of the private data—only that it is highly unlikely to be known by anyone other than the user and an entity that gathers it directly from the user (or issues it to him).

In this illustration, the authenticator asks the user for the amount of his most recent electric bill. Instead of providing that information "in the clear", the user encrypts (or otherwise obfuscates) the data before providing it to the authenticator.

The authenticator then sends the encrypted information on to the utility company or other trusted entity. The utility company can then do one of two things, either of which fulfills the requirements of an embodiment of the present invention: They can decrypt the information and compare it with their records, or they can directly compare the encrypted submission with a corresponding record encrypted in the same manner. It does not matter for the purpose of this invention which method is used.

In one alternative embodiment, the utility can provide files of personal data in encrypted form to the authenticator, who then compares its contents to the data provided by the user. The user data must have been encrypted using the same algorithm as that used by the utility (otherwise comparison of the two bits of encrypted data won't work). The user data must have been encrypted by the user without the data having been first supplied in clear form to the authenticator. The important consideration is that the private data in a readable form remain only in the hands of the user and the data possessor (here, the utility). This prevents the data from being cheapened with use, because unlike with current methods, no other party gets access to the data in readable form.

It is not necessary that the data used for authentication be merchant data, or indeed any particular kind of data. For example, in an alternative embodiment, a user provides text strings of identifying information (either in person or online) and, once identified to the service (the exact means for this is not relevant to the invention), provides a data set to the service that can later be used in the manner of this invention. In this case, the system is used to extend the identification provided at registration to all transactions performed by the user, but making it much easier on the user to do so and not requiring that the initial identifying information be presented over and over to multiple authenticators in a readable, unencrypted form (which would cheapen the identifying information).

The data set can contain almost anything—children's names, nonsense words, dates. The data can be provided to the service in clear-text form or, for additional security, provided only in encrypted form. In the latter case, only the user ever knows what the information strings contain.

What particular type of data is supplied in this manner is not critical. Later, when the user seeks to be authenticated by a site using the service, he provides one of the secret strings (in encrypted form) to the site. The site passes the encrypted string on to the service, which authenticates it as having come from the user. Alternatively, the service could provide a list of strings (in encrypted form) and the authenticator could do its own comparison. Because the strings are encrypted, they are not revealed to the authenticator. The encryption method should be sufficiently thorough so as to not be subject to a black box attack.

The attached drawing FIGURE depicts one possible embodiment, in which the numbered steps represent the sequence of events occurring during authentication. With reference to the enclosed drawing, a transactor (user) sends an access request to a target service (step 1). The target service then sends to a verification service a request for authentication of the transactor (step 2). (In this example, the verification service is labeled "RAF Verification Service" after the name of the assignee of this invention, RAF Technology Inc.) The verification service then issues a knowledge-based authentication challenge ("KBA challenge") to the transactor (step 3), which may include an embedded encryption agent, such as a Java object, Active-X control, etc. The KBA challenge requests that the transactor provide certain specified private data to authenticate the transactor. The transactor's response to the KBA challenge is encrypted at the transactor's computer, by the encryption agent or otherwise, and submitted to the verification service (step 4).

The verification service then retrieves from its database encrypted identification elements stored in its database and corresponding to the purported identity of the transactor (step 5) and compares them against the encrypted challenge response submitted by the transactor (step 6). In the embodiment shown, the identification elements are provided to the authentication service in encrypted form by original data processors (in the drawing there are three, all labeled "data provider") running a compatible encryption process, and the identification elements are then stored by the authentication service in encrypted form. In another embodiment, the comparison is done against a hash table rather than actual data.

The verification service then returns the results of the comparison to the target vendor, e.g., an indication of the correlation (or lack thereof) between the transactor's response to the KBA challenge and the encrypted personal information accessible to the verification service (step 7). The indication may comprise a correlation score calculated by the verification service. Alternatively, it may comprise a pass/fail indication based on predetermined minimum correlation criteria of the authenticator or minimum correlation criteria that are preselected by the target service either at the time of requesting authentication or beforehand. Upon receiving an indication of a positive verification or authentication from the verification service, the target service provider then grants to the transactor access to the requested service (step 8).

Skilled persons will appreciate that the embodiment depicted in FIG. 1 is only one possible embodiment. Illustrative alternative implementations of the technology include but are not limited to the following. For example, the steps performed by the verification service could easily be implemented at the target service (using, say, encrypted data) without compromising the integrity of the private data held by the transactor and the data providers.

In much of the discussion above, the identifying data has been used to establish who the user is. It is also possible to use the data to establish that the user is capable and/or authorized to perform the requested transaction. For example, the user could supply in encrypted form a request to his bank to certify him for a particular dollar amount. The bank could then release to the authenticator a dollar amount authorized for the transaction. No information beyond that on the user's creditworthiness need be released. This particular example is similar to the existing protocol when a merchant sends in an authorization request to a credit card company—he specifies the amount of the bill and the card company authorizes the transaction (or not) for that amount. Thus, in the prior art, there is no veiling of the token (the merchant has the credit card, with its number, in his hand). In accordance with the present invention, by contrast, the merchant would send an encrypted token whose contents were unknown to him, along with the dollar amount.

Authorization also can be established by the user sending an encrypted message via the authenticator to, say, his employer, and the employer could then send back an authorization for the user to perform the desired transaction.

None of the above need necessarily take place over a computer network. All the authorization methods described above would also work were the user present in person before the authenticator. As a practical matter, however, the data storage and retrieval steps performed by the authenticator are facilitated by the use of digital computers and high-speed data storage and retrieval systems.

COMPARISON TO OTHER SYSTEMS AND METHODS

PKI (because it uses a private key registered to the user) authenticates that a particular message comes from the user. This is useful for people who want to go to the trouble of getting and registering public/private keys, but takes place after the initial authentication of the user. It is not useful for initially establishing user identity, while the proposed system is useful for both—establishing initial identity and establishing that the user is the same person who was previously authorized.

Many current systems encrypt a password supplied by a user and compare that encrypted password with a file of encrypted passwords. This is used to allow a transaction or other access to the system. This use somewhat resembles the invention, but the differences are several: The use of a password (encrypted or otherwise) does not in itself provide any identity information on the user. That must be provided at the time the password is issued—the best the password can do is extend that identifying information to the current transaction. The embodiments described herein, on the other hand, establish that the user holds a particular identity, and they do so without any tokens (like passwords) previously established between the user and the system he wishes to access.

Another advantage of the present invention is to enable extension of knowledge of a previously-established identity to subsequent transactions without decreasing the value of personal information for subsequent authentication. This is true whether or not the previous identity was established using the methods of the present invention.

It will be obvious to those having skill in the art that many changes may be made to the details of the above-described embodiments without departing from the underlying principles of the invention. The scope of the present invention should, therefore, be determined only by the following claims.

The invention claimed is:

1. A method of authenticating the identity of a user, in connection with a requested transaction between the user and a target vendor of goods or services, leveraging selected private data of the user without disclosing the private data to the vendor, the method comprising the steps of:

maintaining a database of obfuscated private data associated with a user identifier;

receiving an identity verification request from the target vendor, the verification request including a user identifier;

issuing a KBA—knowledge-based authentication—challenge to a user associated with the received user identifier, the challenge requesting that the user submit at least one specified element of the private data stored in the database;

receiving a response from the user including purported private data responsive to challenge;

if the received purported private data is not obfuscated, obfuscating the purported private data in the same manner as the obfuscated private data is maintained in the database;

comparing the obfuscated purported private data to the corresponding obfuscated private data stored in the database; and returning a result of the comparison to the target vendor without disclosing the stored private data in clear form; wherein the foregoing method steps are carried out by a trusted, independent verification service;

the verification service receives the private data from a third-party in obfuscated form and maintains it in the database in that obfuscated form; and the verification service receives the purported private data from the user in obfuscated form, so that the verification service has no access to the private data in clear form.

2. A method according to claim 1 wherein the result includes a pass/fail indication based on said comparing the obfuscated purported private data to the corresponding obfuscated private data stored in the database.

3. A method according to claim 1 and further comprising notifying the user of the result of the comparison.

4. A method according to claim 1 and further comprising communicating a KBA challenge message to the user on behalf of the vendor to confirm the user's ability to effect the requested transaction.

5. A method according to claim 1 and further comprising communicating a KBA challenge message to the user on behalf of the vendor to confirm the user's authority to effect the requested transaction.

6. A method according to claim 1 including providing a server computer coupled to the database of private data; and wherein the identity verification request is transmitted from the target vendor to the server;

the KBA—knowledge-based authentication—challenge is transmitted to the user from the server;

the response to the KBA is transmitted from the user to the server; and the result is transmitted from the server to the requesting target vendor.

7. A method according to claim 6 wherein the said transmissions of information among the server, the vendor and the user are carried out via a communications network.

8. A method according to claim 6 wherein the said transmissions of information among the server, the vendor and the user are carried out via a computer network.

9. A method according to claim 6 and further comprising returning a result of the comparison from the server to the user.

10. A method of authenticating the identity of a user, in connection with a requested transaction between the user and a target vendor of goods or services, leveraging selected private data of the user without disclosing the private data to the vendor, the method comprising the steps of:

maintaining a database of obfuscated private data associated with a user identifier;

receiving an identity verification request from the target vendor, the verification request including a user identifier;

issuing a KBA—knowledge-based authentication—challenge to a user associated with the received user identifier, the challenge requesting that the user submit at least one specified element of the private data stored in the database;

receiving a response from the user including purported private data responsive to challenge;

if the received purported private data is not obfuscated, obfuscating the purported private data in the same manner as the obfuscated private data is maintained in the database;

comparing the obfuscated purported private data to the corresponding obfuscated private data stored in the database; and returning a result of the comparison to the target vendor without disclosing the stored private data in clear form;

wherein the result includes a correlation score calculated based on said comparing the obfuscated purported private data to the corresponding obfuscated private data stored in the database.

11. A method of authenticating the identity of a user, in support of a transaction between the user and a target vendor of goods or services, the method comprising the steps of:

maintaining a database of private data elements associated with a user identifier in the custody of a trusted entity;

receiving an identity verification request from the target vendor, the verification request including a user identifier;

issuing a KBA—knowledge-based authentication—challenge to the user associated with the received user identifier, the challenge requesting that the user submit at least one specified element of private data in obfuscated form;

receiving a response from the user including purported private data in obfuscated form;

transmitting the received purported private data to the trusted entity;

at the trusted entity, comparing the purported private data to the corresponding private data elements stored in the database; and returning a result of the comparison to the target vendor; wherein:

the foregoing method steps are carried out by a verification service;

the verification service receives the private data from a third-party in obfuscated form and maintains it in the database in that obfuscated form; and the verification service receives the purported private data from the user in obfuscated form, so that the verification service has no access to the private data in clear form.

12. A method according to claim 11 and further comprising:

if the result returned to the target vendor authenticates the user's identity, receiving from the authenticated user a user-created information string, adding the information string to the database of private data in association with the corresponding user identifier; and using the stored information string for a subsequent knowledge-based authentication of the user's identity.

13. A method according to claim 11 and further comprising:

if the result returned to the target vendor confirms the user's identity, generating a data string;

storing the generated data string in the database of private data in association with the corresponding user identifier;

communicating the stored data string to the user; and using the stored data string for a subsequent knowledge-based authentication of the user's identity.

14. A method according to claim 11 and including the step of de-obfuscating the purported private data at the trusted entity to form clear purported private data; and wherein said comparing step comprises comparing the clear purported private data to the corresponding private data elements stored in the database.

15. A method according to claim 11 wherein:

the private data elements are stored in the database at the trusted entity in obfuscated form; and said comparing step comprises comparing the obfuscated purported private data to the corresponding obfuscated private data elements stored in the database.

16. A method according to claim 11 wherein the trusted entity maintains current private data of the user in connection with its customer relationship with the user.

17. A method according to claim 11 wherein:

the verification service creates a hash table based on the private data; and said comparing step comprises comparing the user-submitted private data to the corresponding hash table.

18. A method according to claim 11 including providing a server computer under control of the verification service and coupled to the database of private data; and wherein the identity verification request is transmitted from the target vendor to the verification service server;

the KBA—knowledge-based authentication—challenge is transmitted to the user from the verification service server;

the response to the KBA is transmitted from the user to the verification service server; and the result is transmitted from the verification service server to the requesting target vendor.

19. A method according to claim 11 wherein the said transmissions of information among the server, the vendor and the user are carried out via a communications network.

20. A method according to claim 11 wherein the said transmissions of information among the server, the vendor and the user are carried out via a computer network.

21. A method of verifying authorization of a user to conduct a requested transaction between the user and a target vendor of goods or services, leveraging selected private data of the user without disclosing the private data to the vendor, the method comprising the steps of:

maintaining a database of obfuscated private data associated with a user identifier, the private data including authorization data;

receiving an authorization verification request from the target vendor, the verification request comprising an obfuscated token that reflects a user identifier and a description of the requested transaction;

comparing the authorization verification request to the authorization data stored in the database in association with the user identifier, without de-obfuscating either the request or the stored authorization data; and returning a result of the comparison to the target vendor indicating whether or not the requested transaction is consistent with the user's authorization data.

* * * * *